US008817287B2

(12) United States Patent
Umeda

(10) Patent No.: US 8,817,287 B2
(45) Date of Patent: Aug. 26, 2014

(54) IMAGE FORMING APPARATUS, METHOD FOR CONTROLLING THE SAME, AND STORAGE MEDIUM

(71) Applicant: Canon Kabushiki Kaisha, Tokyo (JP)

(72) Inventor: Yoshinobu Umeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/783,882

(22) Filed: Mar. 4, 2013

(65) Prior Publication Data

US 2013/0235406 A1 Sep. 12, 2013

(30) Foreign Application Priority Data

Mar. 6, 2012 (JP) .................................. 2012-048855

(51) Int. Cl.
| | |
|---|---|
| *G06F 15/00* | (2006.01) |
| *G06F 3/12* | (2006.01) |
| *G06K 1/00* | (2006.01) |
| *G06F 1/32* | (2006.01) |
| *H04N 1/00* | (2006.01) |

(52) U.S. Cl.
CPC ............ *G06F 3/1229* (2013.01); *G06F 1/3203* (2013.01); *H04N 1/00891* (2013.01)
USPC ......................................... 358/1.13; 358/1.15

(58) Field of Classification Search
CPC .. G06F 3/1229; G06F 1/3203; H04N 1/00891
USPC .......................................... 358/1.13, 1.15, 1.1
See application file for complete search history.

(56) References Cited

U.S. PATENT DOCUMENTS

| | | | | |
|---|---|---|---|---|
| 8,351,805 | B2 * | 1/2013 | Nakaminato et al. | ........... 399/37 |
| 2009/0060136 | A1 * | 3/2009 | Tamakoshi | ....................... 378/91 |

FOREIGN PATENT DOCUMENTS

JP 2009-187396 A 8/2009

* cited by examiner

*Primary Examiner* — Douglas Tran
(74) *Attorney, Agent, or Firm* — Canon U.S.A., Inc. IP Division

(57) ABSTRACT

An image forming apparatus includes a first communication processing unit and a second communication processing unit, which communicate with an external device, respectively. A power supply unit supplies power to the second communication processing unit and a switching unit switches from the first communication processing unit to the second communication processing unit as a communication destination of the external device, when the first communication processing unit receives data from the external device in a power-saving state where the power supply unit supplies power to the first communication processing unit and the power supply unit stops supplying the power to the second communication processing unit.

8 Claims, 10 Drawing Sheets

FIG. 12

| PID NAME | VALUE |
|----------|----------|
| ACK | 00101101 |
| NACK | 10100101 |
| STALL | 11100001 |

IMAGE FORMING APPARATUS, METHOD FOR CONTROLLING THE SAME, AND STORAGE MEDIUM

BACKGROUND OF THE INVENTION

1. Field of the Invention

The present invention relates to an image forming apparatus, a method for controlling the same, and a storage medium.

2. Description of the Related Art

Many of conventional multifunction peripherals (hereinafter referred to as MFPs) have a function of entering a power-saving state providing lower power consumption, for example, by stopping supplying the power to some circuits or stopping supplying a clock, when a standby state continues for a certain period of time, thus reducing power consumption. The above-described power-saving state providing low power consumption is sometimes referred to also as a sleep state (power-saving mode).

It is desired that, when an MFP in the power-saving state detects a signal input from a device connected to an external interface, the MFP returns to an operating state from the power-saving state, and then executes a predetermined job from a user. Specifically, the external interface refers to a facsimile (FAX) controller and a local area network (LAN) controller, and the predetermined job refers to a FAX reception job and a print job.

The MFP returns to the operating state using as a trigger a calling indicator (CI) detection signal input to the FAX controller via a telephone line. Then, upon reception of data following the CI detection signal, the MFP becomes able to receive a job during the power-saving state.

Even in the power-saving state, the MFP supplies the power to the LAN controller provided outside a main central processing unit (CPU). Upon reception of a packet from outside via the LAN controller, the MFP returns to the operating state and responds to a print request from a personal computer (PC).

During a copy operation, the user directly returns the MFP to the operating state by performing a power-saving recovery operation on an operation unit and executes a copy job.

However, universal serial bus (USB) device control is often performed by using a USB device controller built in the high-performance main CPU. A common CPU is not provided with a function of separately controlling the power supply of the USB device controller and the power supply of other portions.

Therefore, if power supply to the main CPU stops in the sleep state, the built-in USB device controller also stops operation, thereby making it impossible to respond to a packet transmitted from a USB host. In the power-saving state, therefore, a print job cannot be executed via a USB device.

Although a method for continuing power supply to the main CPU in the power-saving state is effective, the main CPU provides high power consumption to control devices in addition to the USB device, which remarkably reduces the effect of the power saving measures. To cope with this problem, Japanese Patent Application Laid-Open No. 2009-187396 discusses a technique for supplying in the power-saving state the power to a USB device controller from a host apparatus such as a PC.

However, the technique discussed in Japanese Patent Application Laid-Open No. 2009-187396 supplies the power to the USB device controller from the host apparatus such as a PC, and, therefore, has a problem that the effect of the power-saving measures is not sufficient in the entire configuration including the PC although the power consumption of an MFP is reduced.

SUMMARY OF THE INVENTION

The present invention is directed to providing an image forming apparatus.

According to an aspect of the present invention, an image forming apparatus includes a first communication processing unit and a second communication processing unit respectively configured to communicate with an external device, a switching unit configured to switch from the first communication processing unit to the second communication processing unit as a communication destination of the external device, and a power supply unit configured to supply power to the first communication processing unit and the second communication processing unit, wherein, when the first communication processing unit receives data from the external device in a power-saving state where the power supply unit supplies power to the first communication processing unit and the power supply unit stops supplying the power to the second communication processing unit, the power supply unit supplies power to the second communication processing unit and the switching unit switches from the first communication processing unit to the second communication processing unit as a communication destination of the external device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 12 illustrates information stored in a packet identifier (ID) field of the handshake packet.

DESCRIPTION OF THE EMBODIMENTS

Various exemplary embodiments, features, and aspects of the invention will be described in detail below with reference to the drawings.

Figure 1:
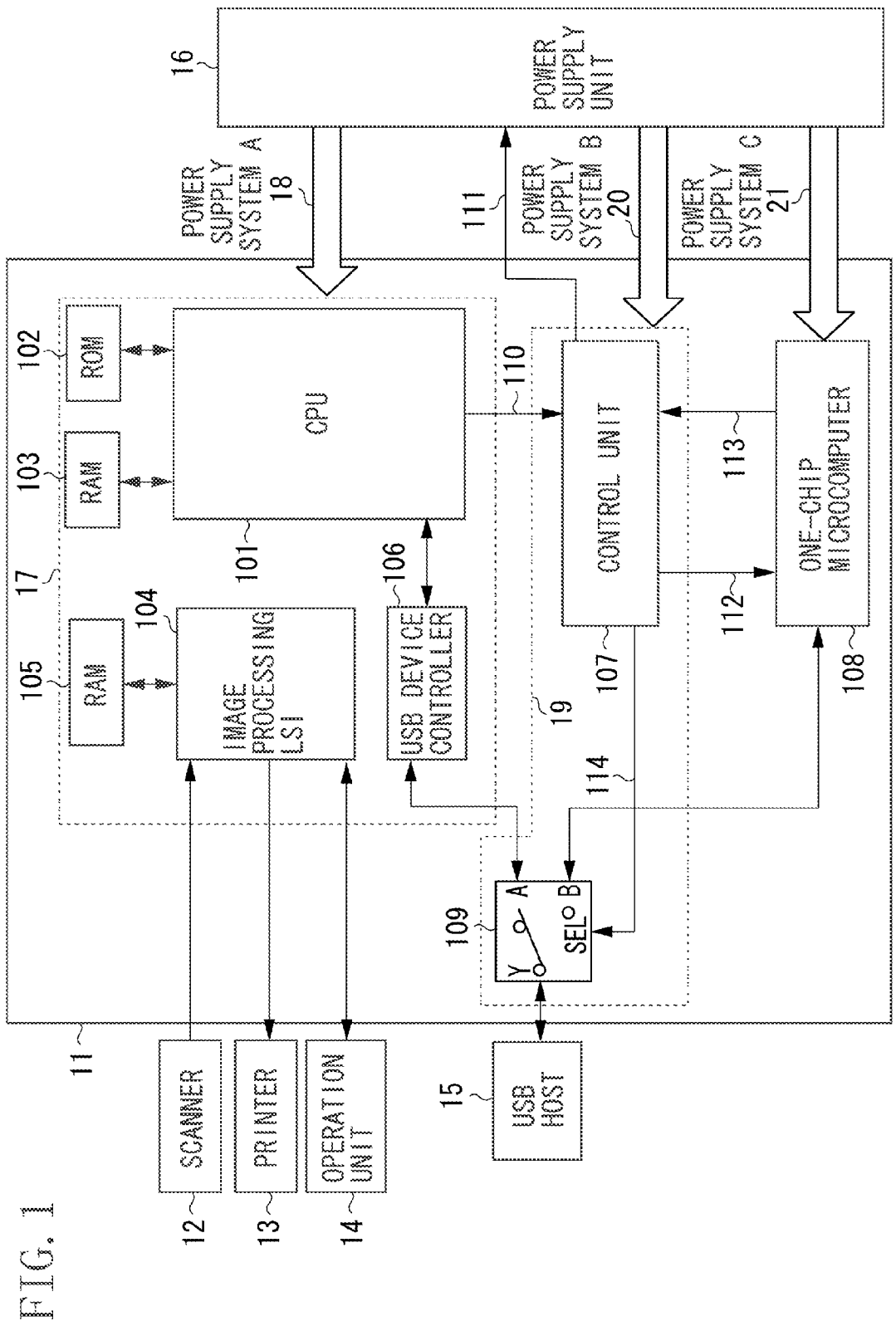
FIG. 1 is a block diagram illustrating an example of a configuration of an image forming apparatus according to an exemplary embodiment of the present invention.

FIG. 1 is a block diagram illustrating an example of a configuration of an image forming apparatus according to an exemplary embodiment of the present invention.

FIG. 1 is a block diagram illustrating a controller unit 11 of the image forming apparatus according to the present exemplary embodiment. The controller unit 11 provided in the image forming apparatus such as a digital MFP rasterizes print data transmitted from an information processing terminal apparatus such as a USB host 15, applies image processing to image data read by a scanner 12, and transmits the image data to a printer 13. The printer 13 prints the print data transmitted from the controller unit 11.

The controller unit 11 receives the power from a power supply unit 16 and performs power ON/OFF control for the power supply unit 16.

The USB host 15 generates print data according to an instruction from a user and transmits the print data to the controller unit 11 via a USB bus. The scanner 12 reads a document and transmits relevant image data to the controller unit 11.

The printer 13 receives the print data from the controller unit 11 and prints the print data on a recording paper based on various printing processes such as an ink jet process and an electrophotographic process. An operation unit 14 is a console panel for accepting an instruction, such as a copy request and a scan request input by the user.

The power supply unit 16 supplies the power to the controller unit 11. The controller unit 11 includes three different power supply systems (a power supply system A, a power supply system B, and a power supply system C), which will be described in detail below. The power supply unit 16 starts and stops supplying the power to respective power supply systems according to a control signal transmitted from the controller unit 11.

The controller unit 11 includes a CPU 101, a read only memory (ROM) 102, random access memories (RAMs) 103 and 105, an image processing large-scale integration (LSI) 104, a USB device controller 106, a control unit 107, a one-chip microcomputer 108, and a USB bus switch 109.

The CPU 101 controls operations of the entire image forming apparatus including the controller unit 11. Digital MFPs employ a large-scale high-speed CPU to process a large volume of data at high speeds.

The CPU 101 outputs a CPU state signal 110 to the control unit 107 to enable the control unit 107 to refer to the state of the CPU 101. Specifically, when the CPU state signal 110 is "1", it indicates that the power is being supplied from the power supply unit 16 to the CPU 101 and the CPU 101 is operating. When the CPU state signal 110 is "0", it indicates that the power is not being supplied from the power supply unit 16 and the CPU 101 stops (is in a sleep state).

In the present exemplary embodiment, it is defined that the CPU 101 is operating while the CPU state signal 110 is "1". During a time period since the power supply unit 16 starts supplying the power to the CPU 101 until the CPU 101 is activated, the CPU 101 has not become ready for operation and therefore outputs "0" as the CPU state signal 110. When the activation process of the CPU 101 is completed (specifically, when the CPU 101 has become ready to acquire print data transmitted from the USB device controller 106), the CPU 101 outputs "1" as the CPU state signal 110.

The ROM 102 stores various control programs for operating the CPU 101. The RAM 103 is used as a work memory by the CPU 101 to temporarily store data required for calculations. The RAM 103 may store image data.

The image processing LSI 104 rasterizes print data transmitted from the USB host 15, applies image processing to the print data, reads image data from the scanner 12, and applies image processing to the image data. Similar to the CPU 101, digital MFPs employ a large-scale high-speed LSI as the image processing LSI 104.

The RAM 105 is used as a work memory by the image processing LSI 104 to temporarily store print data and intermediate data under image processing.

The USB device controller 106, an interface for receiving print data from the USB host 15, performs processing for communicating with the USB host 15 connected to the image forming apparatus in conformity with the USB standard. When connected to the USB host 15, the USB device controller 106 performs an initial setting. The USB device controller 106 performs handshake processing during communication with the USB host 15, extracts print data from received data, and transmits the print data to the CPU 101.

The control unit 107 controls power supply to the controller unit 11. The control unit 107 outputs a power supply control signal 111 to the power supply unit 16. According to the power supply control signal 111 from the control unit 107, the power supply unit 16 starts and stops supplying the power to respective power supply systems.

The control unit 107 includes, for example, a programmable logic device (PLD). Processing of the flowchart illustrated in FIG. 2 (described below) is implemented when the control unit 107 operates based on a program stored in an internal programming element. The control unit 107 may be, for example, an application-specific integrated circuit (ASIC). However, the control unit 107 is not limited to the above-described configuration as long as the processing described in the present exemplary embodiment can be achieved.

The three power supply systems A, B, and C of the power supply unit 16 supply the power to blocks of the controller unit 11. The blocks to which the power is supplied by respective power supply systems will be described below.

The power supply system A supplies the power to a block 17 (including the CPU 101, the ROM 102, the RAMs 103 and 105, the image processing LSI 104, and the USB device controller 106) illustrated in FIG. 1.

The power supply system B supplies the power to a block 19 (including the control unit 107 and the USB bus switch 109) illustrated in FIG. 1.

The power supply system C supplies the power to the one-chip microcomputer 108 illustrated in FIG. 1.

Of the three power supply systems A, B, and C to which the power supply unit 16 supplies the power, the power supply systems A and C are controlled by the power supply control signal 111 output by the control unit 107. The power supply system B constantly supplies the power to the block 19 while the image forming apparatus according to the present exemplary embodiment is operating.

In addition to the above-described power control by the power supply control signal 111, the control unit 107 has a function of detecting the state of the CPU 101 by acquiring the CPU state signal 110 output by the CPU 101.

Further, the control unit 107 outputs to the one-chip microcomputer 108 (described below) an enable signal 112 for permitting operations of the one-chip microcomputer 108 and acquires an interrupt signal 113 output by the one-chip microcomputer 108.

The control unit 107 also outputs to the USB bus switch 109 (described below) a switching signal 114 for selecting a USB bus.

The one-chip microcomputer 108 is a processing device including a microprocessor, a RAM, a ROM, various input-output devices, etc. arranged on a single IC chip. Processing of the flowchart illustrated in FIG. 3 (described below) is implemented when the microprocessor in the one-chip microcomputer 108 operates based on a program stored in a ROM therein.

The one-chip microcomputer 108 is not limited to the above-described configuration, and may be a programmable logic device (PLD), an ASIC, a logic circuit, etc. as long as the processing described in the present exemplary embodiment can be achieved. However, the module of the one-chip microcomputer 108 consumes less power than the USB device controller 106 does.

The one-chip microcomputer 108 responds to an access from the USB host 15 on behalf of the USB device controller 106. The one-chip microcomputer 108 inputs the enable signal 112 from the control unit 107.

Upon data input from the USB bus (the USB host 15) while "1" is being input as the enable signal 112 from the control unit 107, the one-chip microcomputer 108 outputs to the USB bus (the USB host 15) a Negative Acknowledgment (NACK) packet for requesting retransmission of the data.

Upon data input from the USB bus while "0" is being input as the enable signal 112 from the control unit 107, the one-chip microcomputer 108 stops operation and therefore does not output the NACK packet to the USB bus even if data is input from the USB bus. The NACK packet will be described below.

As described above, the one-chip microcomputer 108 is provided with functions of outputting the NACK packet and outputting the interrupt signal 113 to the control unit 107 in response to the data input from the USB bus. Therefore, the one-chip microcomputer 108 can be implemented with remarkably less power consumption than the power consumption by the USB device controller 106.

The USB bus switch 109 switches the connection destination of the USB bus connected to a Y terminal between A and B terminals. Bus switching is made according to the state of the signal connected to an SEL terminal.

In the present exemplary embodiment, when "0" is input to the SEL terminal, the USB bus switch 109 connects the Y and A terminals to connect the USB host 15 and the USB device controller 106 via the USB bus. When "1" is input to the SEL terminal, the USB bus switch 109 connects the Y and B terminals to connect the USB host 15 and the one-chip microcomputer 108 via the USB bus.

With the image forming apparatus illustrated in FIG. 1, the switching signal 114 output from the control unit 107 is connected to the SEL terminal, the USB bus of the USB host 15 is connected to the Y terminal, the USB device controller 106 is connected to the A terminal, and the one-chip microcomputer 108 is connected to the B terminal. The Y terminal and the USB host 15 are detachably connected via the USB terminal and a USB cable (not illustrated).

With such a configuration, when "0" is output as the switching signal 114 from the control unit 107, the USB host 15 and the USB device controller 106 are connected. When "1" is output as the switching signal 114 from the control unit 107, the USB host 15 and the one-chip microcomputer 108 are connected.

Operations of the image forming apparatus illustrated in FIG. 1 will be described below with reference to flowcharts (in FIGS. 2 and 3) and block diagrams (in FIGS. 4 and 5).

Figure 2:
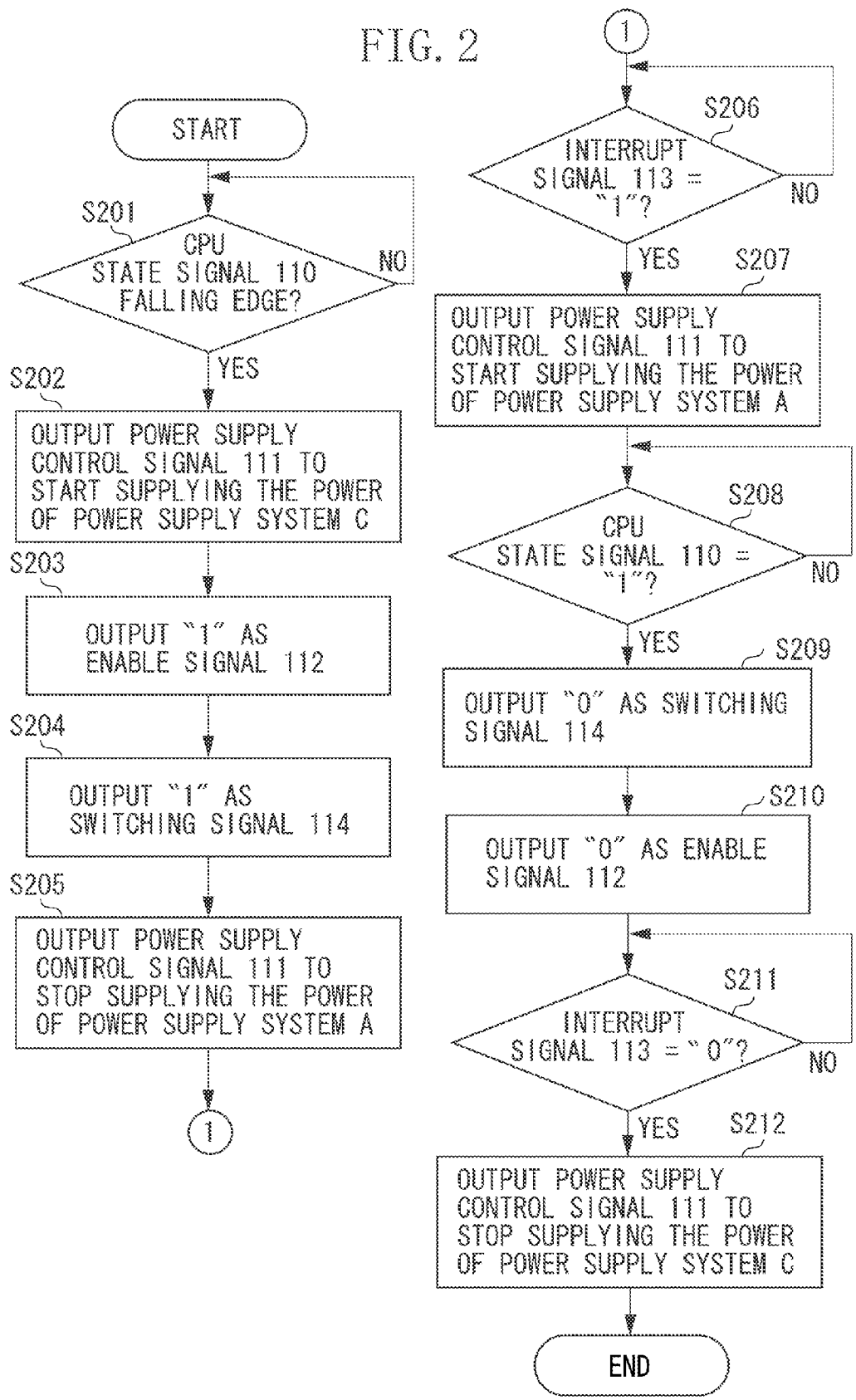
FIG. 2 is a flowchart illustrating operations of a control unit according to a first exemplary embodiment of the present invention.

FIG. 2 is a flowchart illustrating operations of the control unit 107 according to the first exemplary embodiment. Processing of this flowchart is implemented, for example, when the control unit 107 operates based on a program stored in the internal programming element.

Figure 4:
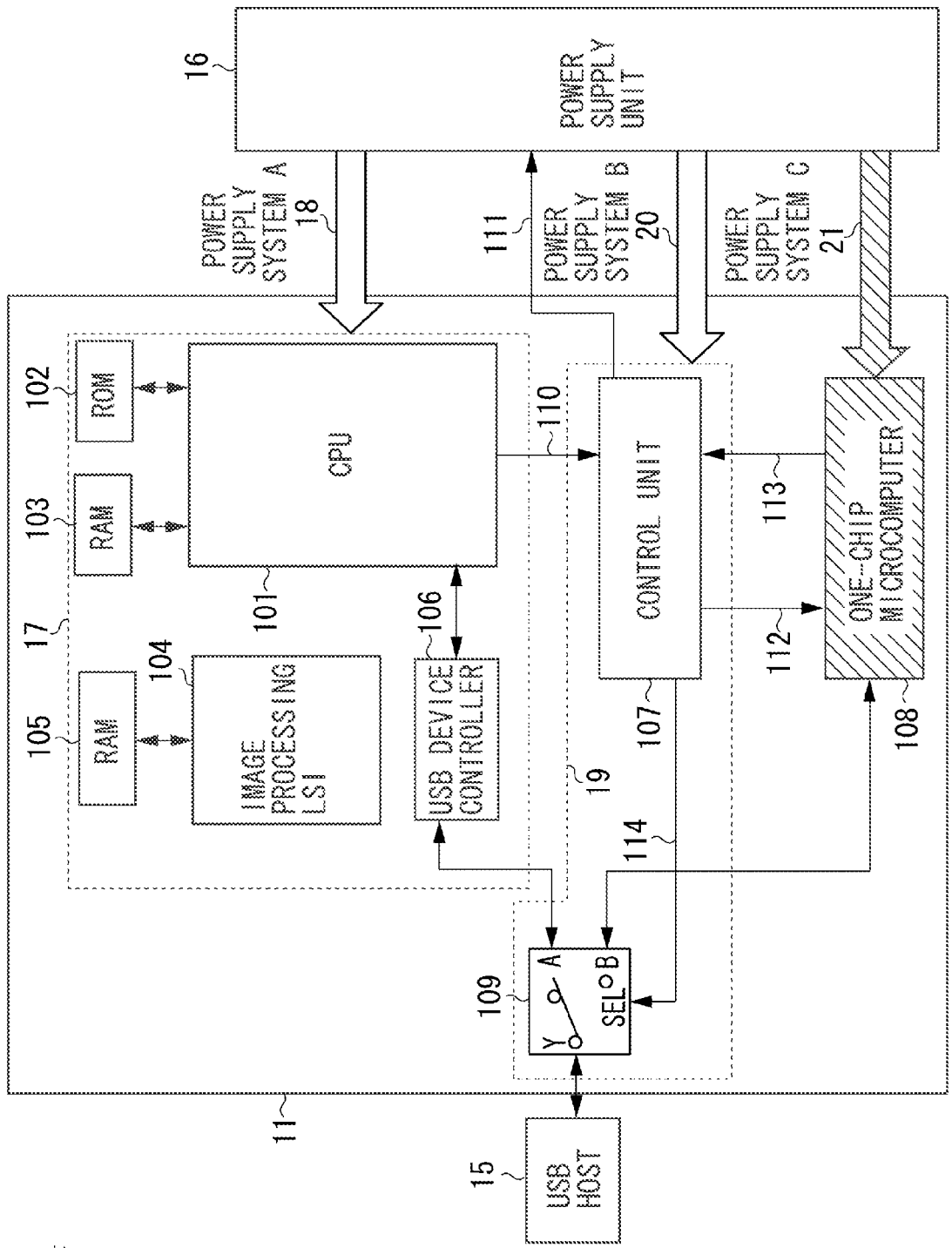
FIG. 4 illustrates a state of the image forming apparatus when processing of the flowchart illustrated in FIG. 2 starts.

FIG. 4 illustrates a state of the image forming apparatus when processing of the flowchart illustrated in FIG. 2 starts. The scanner 12, the printer 13, and the operation unit 14 that are irrelevant to the present description are not illustrated in FIG. 4.

Referring to FIG. 4, the power supply systems A and B of the power supply unit 16 are supplying the power to the controller unit 11. In this state, the CPU 101 and the USB device controller 106 are operating and therefore capable of acquiring data input from the USB host 15 via the USB bus. Therefore, since the one-chip microcomputer 108 does not need to operate, the power is not supplied thereto from the power supply system C.

To transmit the data input from the USB host 15 to the USB device controller 106, the USB bus switch 109 connects the Y and A terminals ("0" is input as the switching signal 114 to the SEL terminal).

Further, the CPU 101 is operating and therefore outputs "1" as the CPU state signal 110.

In the state illustrated in FIG. 4, when a predetermined period of time has elapsed without data input from outside, the CPU 101 enters the sleep state (power-saving mode) and then changes the CPU state signal 110 from "1" to "0".

The processing of the flowchart illustrated in FIG. 2 starts in the state illustrated in FIG. 4 (a state where the power supply systems A and B of the power supply unit 16 are supplying the power to the controller unit 11).

In step S201, the control unit 107 monitors the CPU state signal 110. When the control unit 107 detects a falling edge (a state transition from "1" to "0") of the CPU state signal 110 (YES in step S201), the control unit 107 advances processing to step S202.

In step S202, the control unit 107 outputs the power supply control signal 111 to the power supply unit 16 to control it to start supplying the power of the power supply system C to the controller unit 11.

In step S203, the control unit 107 outputs "1" as the enable signal 112 to the one-chip microcomputer 108. Upon input of "1" as the enable signal 112 from the control unit 107, the one-chip microcomputer 108 waits for data input from the USB host 15.

In step S204, the control unit 107 outputs "1" as the switching signal 114 to the USB bus switch 109 to control it to change its connection of destination from the USB device controller 106 to the one-chip microcomputer 108.

After completion of the processing in step S204, the one-chip microcomputer 108 is capable of acquiring the data input from the USB host 15. In step S205, the control unit 107 outputs the power supply control signal 111 to the power supply unit 16 to control it to stop supplying the power of the power supply system A to the controller unit 11.

Figure 5:
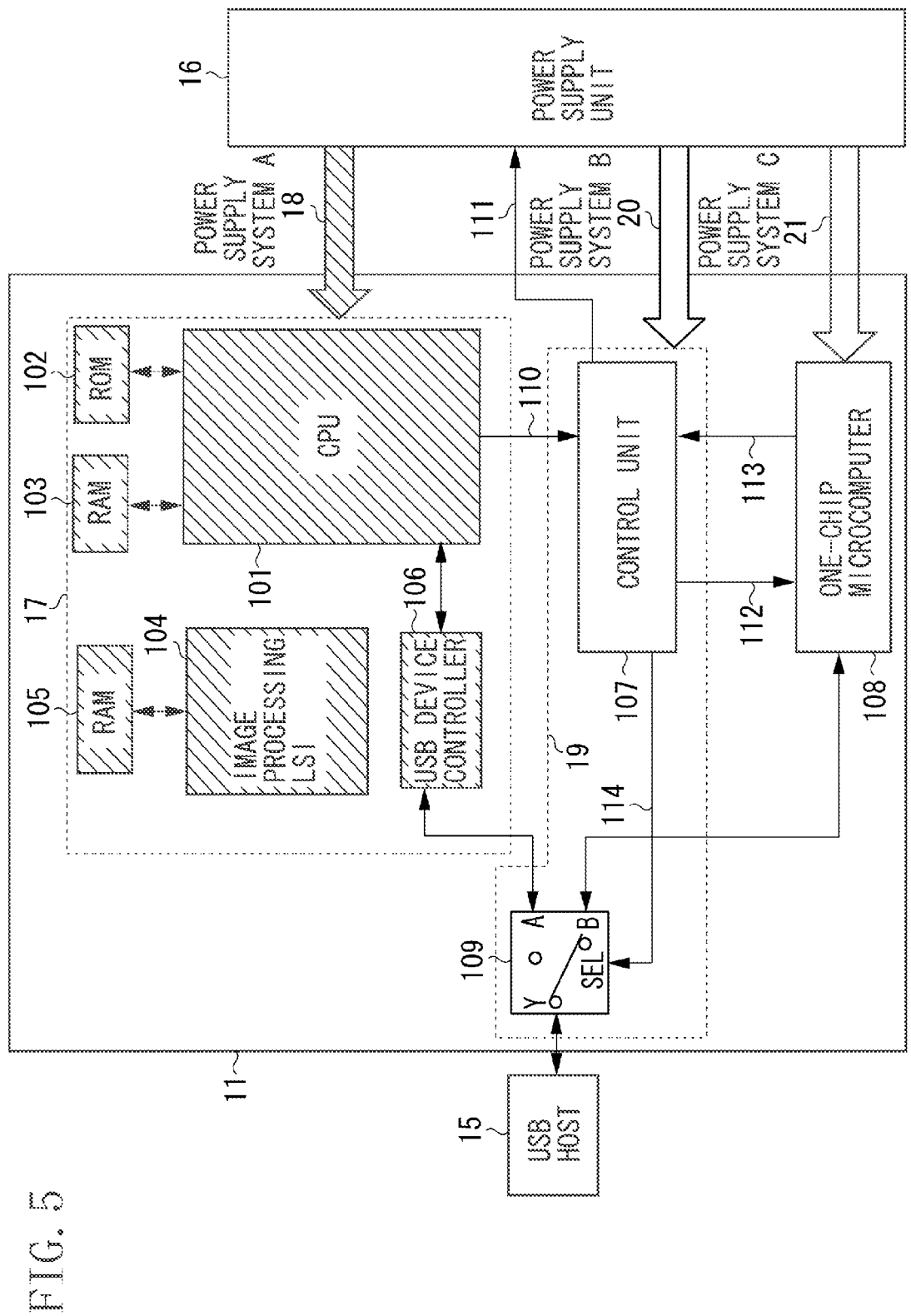
FIG. 5 is a block diagram illustrating a state of the image forming apparatus after completion of processing in step S205 illustrated in FIG. 2.

FIG. 5 illustrates a state of the image forming apparatus after completion of the processing in step S205 illustrated in FIG. 2.

Referring to FIG. 5, the power supply systems B and C of the power supply unit 16 are supplying the power to the controller unit 11. In this state, since the controller unit 11 needs to acquire via the one-chip microcomputer 108 the data input from the USB host 15 via the USB bus, the power supply system C is supplying the power to the controller unit 11. On the other hand, since the CPU 101 is in the sleep state, power supply from the power supply system A to the controller unit 11 stops and the power is not supplied to the block 17.

To transmit to the one-chip microcomputer 108 the data input from the USB host 15, the Y and B terminals are connected by the USB bus switch 109 ("1" is input as the switching signal 114 to the SEL terminal in step S204 in FIG. 2).

Further, since the CPU 101 is in the sleep state, the CPU 101 outputs "0" as the CPU state signal 110.

FIG. 2 will be described again below.

When the power of the power supply system. A stops in step S205, then in step S206, the control unit 107 refers to the interrupt signal 113 and waits for an input of "1" as the interrupt signal 113. In response to the data input from the USB host 15, the one-chip microcomputer 108 outputs the NACK packet to the USB host 15 and outputs the interrupt signal 113 to the control unit 107.

When the control unit 107 determines that "1" is input as the interrupt signal 113, i.e., the NACK packet is output from the one-chip microcomputer 108 to the USB host 15 (YES in step S206), the control unit 107 resumes the CPU 101 from the sleep state. Then in step S207, the control unit 107 outputs the power supply control signal 111 to the power supply unit 16 to control it to start supplying the power of the power supply system A to the controller unit 11.

In step S208, the control unit 107 refers to the CPU state signal 110 and waits for an input of "1" as the CPU state signal 110.

When the control unit 107 determines that "1" is input as the CPU state signal 110, i.e., the CPU 101 recovers from the sleep state to a drive state (YES in step S208), then in step S209, the control unit 107 outputs "0" as the switching signal 114 to the USB bus switch 109. Then, the USB bus switch 109 changes the connection destination from the one-chip microcomputer 108 to the USB device controller 106.

After completion of the processing in step S209, the USB device controller 106 is capable of acquiring the data input from the USB host 15. In step S210, the control unit 107 outputs "0" as the enable signal 112 to the one-chip microcomputer 108 to stop operating.

In step S211, the control unit 107 waits for an input of "0" as the interrupt signal 113. When the control unit 107 determines that "0" is input as the interrupt signal 113, i.e., the one-chip microcomputer 108 stops operating (YES in step S211), then in step S212, the control unit 107 outputs the power supply control signal 111 to the power supply unit 16 to control it to stop supplying the power of the power supply system C to the controller unit 11. Thus, the power supply unit 16 stops supplying the power to the one-chip microcomputer 108.

Figure 3:
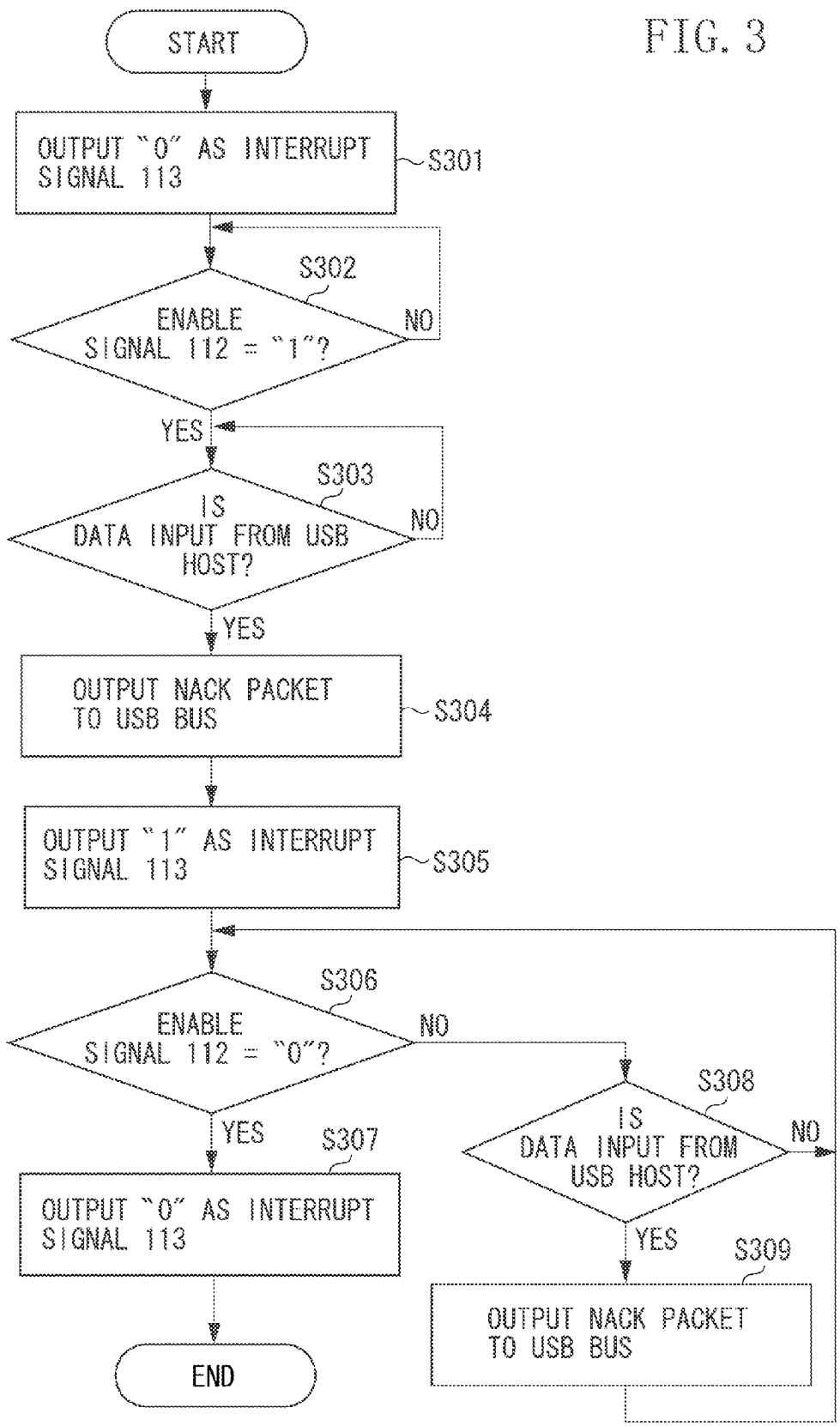
FIG. 3 is a flowchart illustrating operations of a one-chip microcomputer according to the first exemplary embodiment of the present invention.

FIG. 3 is a flowchart illustrating operations of the one-chip microcomputer 108 according to the first exemplary embodiment. Processing of this flowchart is implemented when the microprocessor in the one-chip microcomputer 108 operates based on a program stored in the ROM therein.

In step S202 illustrated in FIG. 2, the power supply unit 16 starts supplying the power to the power supply system C, and the one-chip microcomputer 108 starts operation.

In step S301, after the one-chip microcomputer 108 starts operation, the one-chip microcomputer 108 outputs "0" as the interrupt signal 113. In step S302, the one-chip microcomputer 108 waits for an input of "1" as the enable signal 112.

When the control unit 107 determines that "1" is input as the enable signal 112 (YES in step S302), then in step S303, the one-chip microcomputer 108 waits for an input of data from the USB host 15.

When the control unit 107 determines that the data is input from the USB host 15 (YES in step S303), then in step S304, the one-chip microcomputer 108 outputs to the USB host 15 via the USB bus the NACK packet for requesting retransmission of the data.

In step S305, the one-chip microcomputer 108 outputs "1" as the interrupt signal 113 to the control unit 107 to resume the CPU 101 from the sleep state.

In step S306, the one-chip microcomputer 108 refers to the enable signal 112 input from the control unit 107 to determine whether "0" is input as the enable signal 112.

When the control unit 107 determines that "0" is not input as the enable signal 112 (NO in step S306), then in step S308, the one-chip microcomputer 108 determines whether data is input again from the USB host 15.

When the control unit 107 determines that data is not input again from the USB host 15 (NO in step S308), the processing returns to step S306 and the control unit 107 refers to the enable signal 112 again.

When the control unit 107 determines that data is input again from the USB host 15 (YES in step S308), i.e., when data is input again from the USB host 15 before "0" is input as the enable signal 112, then in step S309, the one-chip microcomputer 108 outputs the NACK packet to the USB host 15 via the USB bus. Then, the processing returns to step S306 and the control unit 107 refers to the enable signal 112 again.

When the control unit 107 determines that "0" is input as the enable signal 112 (YES in step S306), i.e., "0" is input as the enable signal 112 before data is input again from the USB host 15, then in step S307, the one-chip microcomputer 108 outputs "0" as the interrupt signal 113. Then, the processing exits the flowchart illustrated in FIG. 3.

An exemplary method used by the one-chip microcomputer 108 to detect data input from the USB host 15 and output a NACK packet to the USB host 15 will be described below with reference to a data format transmitted by the USB bus.

Figure 6:
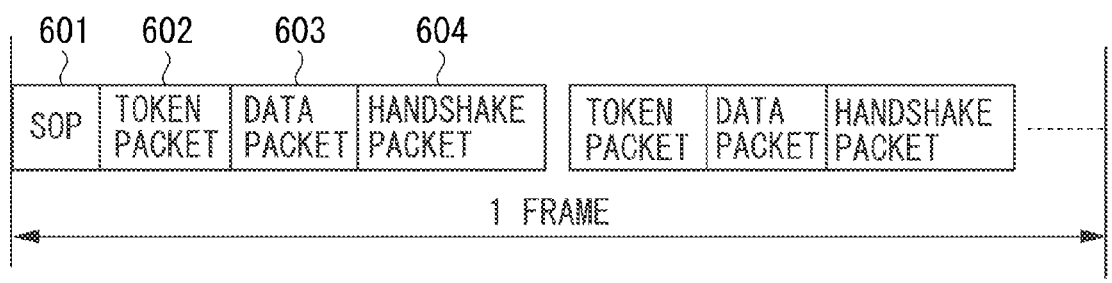
FIG. 6 illustrates a configuration of packets included in a frame.

Data transmission and reception are performed on a frame basis between the USB host 15 and the USB device. FIG. 6 illustrates a packet configuration included in a frame.

A frame includes an SOP 601, one or a plurality of token packets 602, a data packet 603, and a handshake packet 604.

The SOP 601 indicates the start of a frame. When starting data output to the USB device, the USB host 15 outputs the SOP 601 as a starting element of the frame. Following the SOP 601, the USB host 15 outputs to the USB device the token packet 602 for specifying a transmission method and an address of a destination device and then the data packet 603 including the data to be transmitted to the destination device.

Upon input of the data packet 603, the USB device specified in the token packet 602 outputs to the USB host 15 the handshake packet 604 for notifying whether the data packet 603 has been normally received.

Subsequently, the USB host 15 and the USB device perform data transmission and reception by using the token packet 602, the data packet 603, and the handshake packet 604 and, when the data to be transmitted and received runs out, ends the frame.

However, since the maximum time duration used by one frame is specified for the USB bus, not all data may be transmitted and received with one frame. In this case, the frame is once ended. Then, the USB host 15 can output the SOP 601 to generate a new frame and continue data transmission and reception from an interrupted data point at which the last frame was ended.

Figure 7:
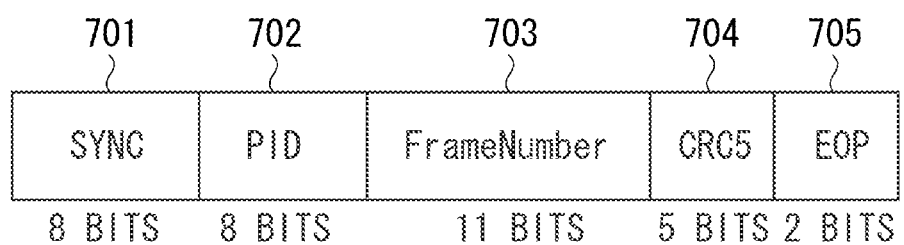
FIG. 7 illustrates an internal structure of a starting packet of a frame, i.e., a start of packet (SOP), illustrated in FIG. 6.

FIG. 7 illustrates an internal structure of the SOP 601 illustrated in FIG. 6.

The SOP 601 includes an 8-bit synchronization (SYNC) field 701, an 8-bit packet ID (PID) field 702, an 11-bit frame number field 703, a 5-bit cyclic redundancy check (CRC) 5 field 704, and a 2-bit EOP field 705.

The SYNC field 701 is used to achieve synchronization of data. The PID field 702 in the SOP 601 includes 8-bit information "01011010" indicating that the current packet is an SOP.

The frame number field 703 stores an identification number for each frame. The CRC5 field 704 including 5 bits is used to detect a transmission error. The EOP field 705 indicates the end of packet, and is output at the end of each packet.

Figure 8:
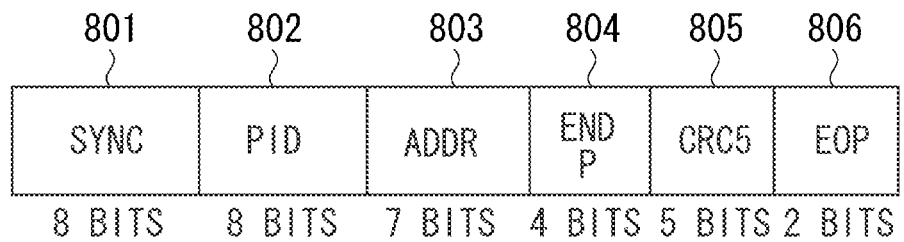
FIG. 8 illustrates an internal structure of a token packet illustrated in FIG. 6.

FIG. 8 illustrates an internal structure of the token packet 602 illustrated in FIG. 6.

The token packet 602 includes an 8-bit SYNC field 801, an 8-bit PID field 802, a 7-bit address (ADDR) field 803, a 4-bit endpoint (ENDP) field 804, a 5-bit CRC5 field 805, and a 2-bit EOP field 806.

The SYNC field 801 is used to achieve synchronization of data similar to the SOP 601. The PID field 802 in the token packet 602 includes information about whether data in the following data packet 603 is IN data to be transmitted from the device to the host or OUT data to be transmitted from the host to the device. Specifically, the PID field 802 includes "10010110" for the IN data to be transmitted from the device to the host or "00011110" for the OUT data to be transmitted from the host to the device.

The ADDR field 803 includes address information for the device which performs data transmission and reception. Similarly, the ENDP field 804 includes end point information for the device which performs data transmission and reception. The CRC5 field 805 including 5 bits is used to detect a transmission error. The EOP field 806 indicates the end of the packet, and is output at the end of each packet.

Figure 9:
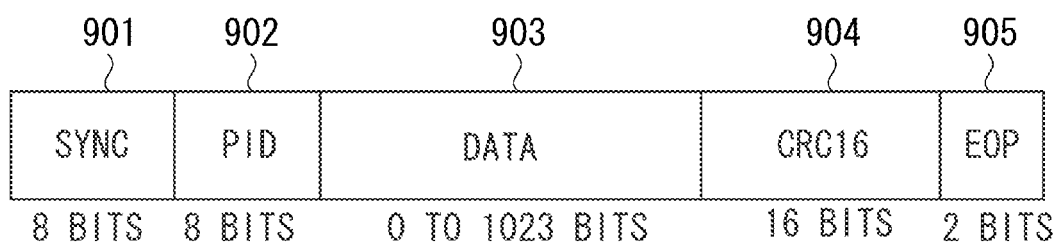
FIG. 9 illustrates an internal structure of a data packet illustrated in FIG. 6.

FIG. 9 illustrates an internal structure of the data packet 603 illustrated in FIG. 6.

The data packet 603 includes an 8-bit SYNC field 901, an 8-bit PID field 902, a 0- to 1023-bit DATA field 903, a 16-bit CRC16 field 904, and a 2-bit EOP field 905.

The SYNC field 901 is used to achieve synchronization of data similar to the SOP 601. The PID field 902 in the data packet 603 includes information about whether the data packet 603 is an even-number packet (DATA0) or odd-number packet (DATA1) as information for confirming synchronization of transmission when transmitting a plurality of data packets. Specifically, the PID field 902 stores "00111100" for DATA0 or "10110100" for DATA1.

The DATA field 903 stores data to be transmitted and received, having a length of up to 1023 bits. The CRC16 904 field including 16 bits is used to detect a transmission error. The EOP field 905 indicates the end of packet, and is output at the end of each packet.

Figure 10:
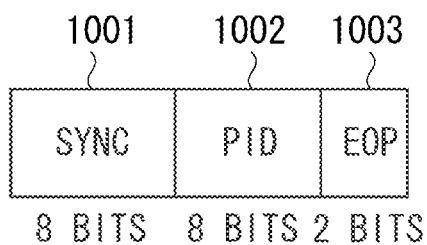
FIG. 10 illustrates an internal structure of a handshake packet illustrated in FIG. 6.

FIG. 10 illustrates an internal structure of the handshake packet 604 illustrated in FIG. 6. The handshake packet 604 includes an 8-bit SYNC field 1001, an 8-bit PID field 1002, and a 2-bit EOP field 1003.

The SYNC field 1001 is used to achieve synchronization of data similar to the SOP 601. The PID field 1002 in the handshake packet 604 stores information about whether the device has normally received the data stored in the data packet 603 (this information will be described in detail below with reference to FIG. 12). The EOP 1003 indicates the end of packet, and is output at the end of each packet.

FIG. 12 illustrates information stored in the PID field 1002 in the handshake packet 604.

Acknowledgment (ACK) information "00101101" indicates that the data packet 603 has normally been received. The host subsequently performs data transmission. In the following description, the handshake packet 604 storing the ACK information in the PID field 1002 will be referred to as an ACK packet.

NACK information "10100101" indicates that the data packet 603 has not normally been received or that communication is not possible. In this case, the USB host 15 retransmits a data packet having the same contents as the last data packet 603. In the following description, the handshake packet 604 storing the NACK information in the PID field 1002 will be referred to as a NACK packet.

STALL information "11100001" indicates that the device, to which data is to be transmitted, is in an error state, and that data transmission cannot be restarted unless the host cancels a function stop state by using a certain method.

Figure 11:
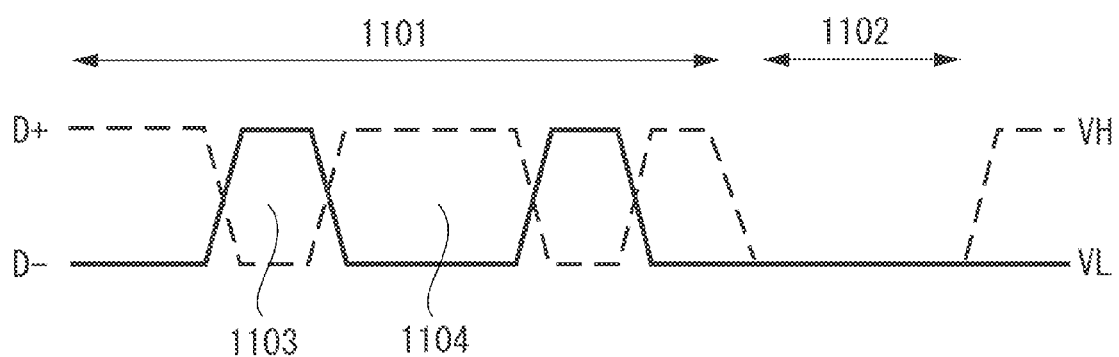
FIG. 11 illustrates USB bus states in an end-of-packet (EOP) field transmitted at the end of each of the SOP, the token packet, the data packet, and the handshake packet.

FIG. 11 illustrates USB bus states in the EOP field transmitted at the end of each of the SOP 601, the token packet 602, the data packet 603, and the handshake packet 604.

The USB bus performs data transmission by using two signal lines D+ and D−. Specifically, referring to a state 1104 in FIG. 11, when a voltage is applied to the signal line D+ (exhibiting a voltage VH), and no voltage is applied to the signal line D− (exhibiting a voltage VL), the USB bus indicates "1" as information.

Conversely, referring to a state 1103 in FIG. 11, when no voltage is applied to the signal line D+ (exhibiting the voltage VL) and a voltage is applied to the signal line D− (exhibiting the voltage VH), the USB bus indicates "0" as information.

The USB bus transmits such information by switching between these two states. For example, a range 1101 illustrated in FIG. 11 represents "1101101" as information.

The signal lines D+ and D− exhibit different voltages in this way to represent different values of information to be transmitted. However, in the EOP field, a range 1102 illustrated in FIG. 11 indicates a state where no voltage is applied to the signal lines D+ and D− (exhibiting the voltage VL) for a time duration for a 2-bit width. In this state where no voltage is applied to the signal lines D+ and D−, the USB host and the device recognize the EOP field.

As described above, by referring to the EOP field, the one-chip microcomputer 108 can output the NACK packet in response to the data input from the USB host 15. Specifically, the one-chip microcomputer 108 may start outputting the NACK packet when three EOP fields of the SOP 601, the token packet 602, and the data packet 603 (in a state where no voltage is applied to the signal lines D+ and D−) have been detected.

The 18-bit information output as a NACK packet can be achieved by outputting a fixed value in this way. Therefore, the one-chip microcomputer 108 may be any type of device as long as the device achieves the above-described function of the one-chip microcomputer 108. The above-described function of the one-chip microcomputer 108 may be implemented only by using logic circuits. However, the power consumption must be less than the power consumption by the USB device controller 106.

As described above, when the CPU 101 is in the sleep state, a packet transmitted from the USB host 15 can be transmitted to the one-chip microcomputer 108 by using the USB bus switch 109, and a NACK signal can be transmitted from the one-chip microcomputer 108 to the USB host 15.

Thus, the CPU 101 can respond to the packet transmitted from the USB host 15 even when the CPU 101 is in the sleep state, and resume from the sleep state. Further, using the one-chip microcomputer 108 with less power consumption than the CPU 101 enables sufficiently acquiring an effect of power-saving measures in the entire system configuration including the PC (the USB host 15) while the CPU 101 in the sleep state.

Specifically, the present invention achieves, while restraining the power consumption of the entire system including the USB host 15, a standby state where the image forming apparatus is capable of responding to the packet transmitted by the USB host 15.

Although the above-described exemplary embodiment is based on communication between an apparatus connected in conformity with the USB standard and an image forming apparatus, the present invention is also applicable to standards other than the USB standard. For example, the present invention is applicable to such a standard that conforms to hot plug with which an apparatus can be attached and detached while the power is turned ON, and defines that, if the receiving side cannot correctly receive data transmitted from the transmitting side, the receiving side transmits predetermined information (equivalent to the NACK packet conforming to the USB standard) back to the transmitting side, and the transmitting side retransmits the relevant data.

The present invention achieves, while restraining the power consumption of the entire system including an apparatus connected to an image forming apparatus (for example, by using a USB connection), a standby state where the image forming apparatus is capable of responding to a packet transmitted by the apparatus connected to the image forming apparatus.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-048855 filed Mar. 6, 2012, which is hereby incorporated by reference herein in its entirety.

What is claimed is:

1. An image forming apparatus comprising:
   a first communication processing unit and a second communication processing unit respectively configured to communicate with an external device;
   a switching unit configured to switch from the first communication processing unit to the second communication processing unit as a communication destination of the external device; and
   a power supply unit configured to supply power to the first communication processing unit and the second communication processing unit,
   wherein, when the first communication processing unit receives data from the external device in a power-saving state where the power supply unit supplies power to the first communication processing unit and the power supply unit stops supplying the power to the second communication processing unit, the power supply unit supplies power to the second communication processing unit and the switching unit switches from the first communication processing unit to the second communication processing unit as a communication destination of the external device.

2. The image forming apparatus according to claim 1, wherein the image forming apparatus is a Universal Serial Bus (USB) device and the external device is a USB host.

3. The image forming apparatus according to claim 1, wherein, when the first communication processing unit receives data from the external device, the first communication processing unit transmits information indicating that the first communication processing unit cannot correctly receive the data.

4. The image forming apparatus according to claim 3, wherein the information is a negative acknowledgement (NACK) signal.

5. The image forming apparatus according to claim 3, wherein the second communication processing unit receives to process data retransmitted from the external device that has received the information.

6. The image forming apparatus according to claim 1, wherein, when a condition to enter the power-saving state is satisfied, the switching unit switches from the second communication processing unit to the first communication processing unit as a communication destination of the external device.

7. A method for controlling an image forming apparatus including a first communication processing unit and a second communication processing unit respectively configured to communicate with an external device, a switching unit configured to switch from the first communication processing unit to the second communication processing unit as a communication destination of the external device, and a power supply unit configured to supply power to the first communication processing unit and the second communication processing unit, the method comprising:
   receiving data from the external device by the first communication processing unit in a power-saving state where the power supply unit supplies power to the first communication processing unit and the power supply unit stops supplying the power to the second communication processing unit,
   transmitting a response to the received data by the first communication processing unit to the external device,
   supplying the power to the second communication processing unit when the first communication processing unit receives the data from the external device,
   switching from the first communication processing unit to the second communication processing unit as a communication destination of the external device when the first communication processing unit receives the data from the external device, and receiving data retransmitted from the external device that has received the response.

8. A non-transitory storage medium on which is stored a computer program for causing a computer to execute each step in the method according to claim 7.

* * * * *